US005709895A

United States Patent [19]

Tanaka et al.

[11] Patent Number: 5,709,895
[45] Date of Patent: Jan. 20, 1998

[54] PROCESS FOR PRODUCING FLAVOR-CONTAINING CAPSULE

[75] Inventors: Shigeru Tanaka, Whippany; Charles H. Manley, Ringwood, both of N.J.; Katsumi Nagano, Kanagawa, Japan

[73] Assignees: Takasago International Corporation (USA), N.J.; Takasago International Corporation, Tokyo, Japan

[21] Appl. No.: 417,965

[22] Filed: Apr. 6, 1995

Related U.S. Application Data

[63] Continuation-in-part of Ser. No. 251,289, May 31, 1994, abandoned.

[51] Int. Cl.⁶ .................................................. A23L 1/00
[52] U.S. Cl. ........................... 426/96; 426/89; 426/103; 426/650; 426/661; 426/518
[58] Field of Search .......................... 426/96, 650, 651, 426/89, 103, 658, 661, 518

[56] References Cited

U.S. PATENT DOCUMENTS

| | | | |
|---|---|---|---|
| 2,566,410 | 9/1951 | Griffin | 99/140 |
| 2,809,895 | 10/1957 | Swisher | 99/140 |
| 3,041,180 | 6/1962 | Swisher | 99/140 |
| 3,314,803 | 4/1967 | Dame et al. | 99/140 |
| 3,704,137 | 11/1972 | Beck | 99/140 R |
| 3,736,149 | 5/1973 | Knapp | 99/78 |
| 4,271,202 | 6/1981 | Giel | 426/96 |
| 4,532,145 | 7/1985 | Saleeb et al. | 426/96 X |
| 4,582,716 | 4/1986 | Pickup et al. | 426/96 X |
| 4,610,890 | 9/1986 | Miller et al. | 426/651 |
| 4,689,235 | 8/1987 | Barnes et al. | 426/89 |
| 4,698,264 | 10/1987 | Steinke et al. | 426/96 X |
| 4,707,367 | 11/1987 | Miller et al. | 426/96 |
| 4,820,534 | 4/1989 | Saleeb et al. | 426/96 |
| 5,021,249 | 6/1991 | Bunick et al. | 426/96 X |

FOREIGN PATENT DOCUMENTS

| | | |
|---|---|---|
| 52-37062 | 9/1977 | Japan . |
| 61-12248 | 1/1986 | Japan . |

OTHER PUBLICATIONS

JPO Abstracts, Abstracting JP 55-74773, Abstract Publication Date Aug. 23, 1980.

*Primary Examiner*—Leslie Wong
*Attorney, Agent, or Firm*—Sughrue, Mion, Zinn, Macpeak & Seas, PLLC

[57] ABSTRACT

A process for producing flavor-containing sugar-free capsule, the flavor being encapsulated in a carbohydrate mixture containing polysaccharide(s) and hydrogenated saccharide(s) at a weight ratio of from about 15:85 to about 85:15 on a solid basis. Flavor-containing sugar-free capsules which have a low cariogenicity and a structural strength of a certain level and can be stored for a prolonged period of time can be obtained.

5 Claims, No Drawings

PROCESS FOR PRODUCING FLAVOR-CONTAINING CAPSULE

This is a continuation-in-part of application Ser. No. 08/251,289, filed May 31, 1994, now abandoned.

FIELD OF THE INVENTION

This invention relates to a process for producing flavor-containing capsules which can be used for imparting a flavor to foods over a wide range. More particularly, it relates to a process for producing flavor-containing sugar-free capsules, wherein a flavor is encapsulated in a carbohydrate mixture containing modified starch(es) with hydrogenated saccharide(s).

BACKGROUND OF THE INVENTION

A number of attempts have been made hitherto to encapsulate flavor components in various carbohydrates. Encapsulation makes it possible to prevent a flavor component from oxidation and volatilization so as to improve its keeping qualities. Also, handling characteristics can be improved thereby. In recent years, these capsules have been widely employed in various foods, in particular, candies and chewing gums, since they have a characteristic encapsulated structure and can be colored into various colors.

Examples of methods for encapsulating flavor components which have been proposed hitherto are as follows.

(1) JP-A-49-62677 (corresponding to U.S. Pat. No. 3,704, 137), JP-A-52-94452 (corresponding to U.S. Pat. No. 4,271, 202), JP-A-61-12248, and JP-A-61-502656 (corresponding to U.S. Pat. No. 4,610,890 and U.S. Pat. No. 4,707,367). (The term "JP-A" as used herein means an "unexamined published Japanese patent application".)

A mixture comprising a saccharide such as sucrose, a starch hydrolyzate and an emulsifier is heated and a flavor component such as an essential oil or an edible oil and fat is added thereto. Then the resulting mixture is extruded into a cold solvent and thus molded.

(2) JP-B-34-5600 (corresponding to U.S. Pat. No. 2,809, 895). (The term "JP-B" as used herein means an "examined Japanese patent publication".)

An essential oil (i.e. a flavor component) is dispersed in heated corn syrup and molded by extrusion.

(3) JP-A-47-11978 (corresponding to U.S. Pat. No. 3,736, 149).

Acetaldehyde, which is a flavor component, is fixed in a mixture of lactose, a hydrophilic colloid and a starch hydrolyzate.

(4) JP-B-52-37062.

A flavor component is added to an aqueous solution of saccharides, in which maltose, lactose, malto-triose or raffinose and corn syrup, dextrin and malto-dextrin are mixed at a definite ratio in the form of molecules, and then mixed and dried.

(5) JP-A-61-501078 (corresponding to U.S. Pat. No. 4,689,235).

A flavor component such as a fruit essence is encapsulated in a substrate which has been prepared by adding water to a mixture of malto-dextrin with hydrogen octenyl butanedioate amylodextrin at a definite ratio, stirring and boiling.

(6) JP-A-49-132251 and U.S. Pat. No. 2,566,410.

A flavor component such as a powdery fat or an essential oil is fixed with an aqueous solution of sorbitol or molten sorbitol.

(7) U.S. Pat. No. 3,314,803.

Acetaldehyde, which is one of volatile components of a flavor substance, is fixed with mannitol.

(8) U.S. Pat. No. 4,532,145.

A fixed acetaldehyde composition having an amorphous substrate is produced by the process comprising the steps of:
  (a) forming an aqueous solution which consists of (a-1) and (a-2), where
    (a-1) is 10 to 30% by weight of a water soluble, crystalline, low molecular weight material (ex. 30% mannitol) and
    (a-2) is no less than 70% by weight of a water soluble maltodextrin;
  (b) incorporating acetaldehyde into the solution of step (a) and thereafter;
  (c) spray-drying the aqueous solution.

(9) U.S. Pat. No. 3,041,180.

Corn syrup solids are mixed with glycerol or nontoxic glycol and heated. Then an essential oil (i.e., a flavor component) is fixed therewith.

(10) U.S. Pat. No. 4,820,534.

A substrate comprising a minor component selected from water-soluble carbohydrates such as fructose and a polymeric, carbohydrate material such as malto-dextrin having a dextrose equivalent (DE) up to 20 is mixed with volatile flavorants (flavor components) without any added moisture. The obtained mixture is heated above the glass transition temperature of the substrate in a single screw extruder. Then it is extruded, cooled and molded to thereby give glassy capsules.

Among the conventional techniques as cited above, the methods (1) comprise using sucrose, i.e., sugar as the main component. Recently the application of flavor-containing capsules produced by these methods (1) to foods with a need for low cariogenicity (for example, candies, chewing gums) has been restricted for fear of tooth decay with sugar.

Although flavor-containing capsules produced by the methods (2) to (5) with the use of saccharides and polysaccharides other than sucrose have low cariogenicity, they are week in structure compared with those produced by using sugar. When these capsules are used in the production of, for example, a chewing gum base which is to be mixed at a relatively high temperature and exposed to a shear force in the mixing stage, the capsule structure is broken in the course of the production process. Thus the performance of the capsules per se of liberating the flavor upon eating (chewing) cannot be exerted in this case.

In the methods (6) to (9), sugar alcohols such as sorbitol, mannitol and glycerol, which are typical examples of low cariogenic materials, are used as the main component. However, the production of flavor-containing capsules by these methods frequently requires troublesome operations, for example, heating at a high temperature. There is another disadvantage that the capsules thus obtained have a high hygroscopicity caused by the hygroscopicity of sugar alcohols as the main component and thus can be hardly stored for a long period of time.

Also, flavor-containing capsules can be produced without using sucrose by the method (10). However it involves some limiting factors (for example, use of no moisture in the mixing step, heating temperature), which restricts base materials usable therein and, in its turn, limits the amount of the flavor component to be encapsulated (in every example of the specification of the patent as cited above, the amount of the flavor component is 5% by weight or below based on the base material).

Accordingly, there have been required an improved method for producing a flavor-containing capsule, which has a low cariogenicity and a structural strength at a certain level and can be stored for a prolonged period of time, without any difficult operation.

SUMMARY OF THE INVENTION

To solve the above-mentioned problem, the present inventors have noted hydrogenated saccharides as compounds having a low cariogenicity. These compounds generally have a high hygroscopicity and therefore it is difficult to obtain capsules capable of being stored for a prolonged period of time from the compounds only.

Therefore, the present inventors have extensively investigated, and as a result, they have found out that flavor-containing capsules produced by encapsulating a flavor in a carbohydrate mixture containing hydrogenated saccharide(s) and modified starch(es) at a specific mixing ratio have a low cariogenicity and a structural strength at a certain level, can be stored for a prolonged period of time and can overcome the problem of hygroscopicity, thus completing the present invention.

Accordingly, the present invention provides a process for producing flavor-containing sugar-free capsules, said flavor being encapsulated in a carbohydrate mixture comprising modified starch(es) and specific hydrogenated saccharide(s) at a weight ratio ranging from about 15:85 to about 85:15 on a solid basis.

DETAILED DESCRIPTION OF THE INVENTION

Now, the present invention will be described in greater detail.

For the embodiment of the present invention, it is preferable to employ a method which comprises the steps of heating a carbohydrate mixture containing modified starches and hydrogenated saccharides to thereby give a molten matter, adding a flavor to the molten matter and mixing them to thereby give a uniform mixture, solidifying this uniform mixture by rapidly cooling under extrusion, and cutting or grinding the solid matter thus obtained, since capsules can be continuously and efficiently produced thereby.

Although the mixing weight ratio of the modified starch to the hydrogenated saccharide varies depending on the form and amount of the selected flavor, it ranges from about 15:85 to about 85:15, preferably from about 15:85 to about 50:50, and still preferably from about 15:85 to about 30:70, on a solid basis. When the content of the modified starch exceeds about 85% by weight based on the whole carbohydrate mixture, the viscosity of the mixture is elevated at the heating step and thus it becomes difficult to add the flavor thereto. When the content of the hydrogenated saccharide exceeds about 85% by weight based on the whole carbohydrate mixture, capsules having a preferable structural strength can be hardly obtained. As will be discussed hereinafter, this carbohydrate mixture should preliminarily be heated until the moisture content thereof is lowered to a definite level in order to elevate the moisture-stability of the resulting capsules. When the carbohydrate mixture contains the hydrogenated saccharide at an excessively large content, the vaporization of the moisture becomes difficult and thus an elevated heating temperature is required.

The modified starches to be used in the present invention may be either solid ones or liquid ones.

The modified starches are products prepared by chemical treatment of starches, e.g., acid treatment starches (ex. dextrin), enzyme treatment starches (ex. dextrin), boiling starches (ex. α-starch), oxidized starches, cross-bonding starches and other starch derivatives (see, *PRINCIPLES OF FOOD CHEMISTRY, Second Edition*, written by John M. deMAN, issued by Van Nostrand Reinhold (New York), 1990, pp. 167–168.

In the case of dextrin, those having a low DE (in particular, up to about 20) are preferably used. Dextrin having a DE exceeding about 20 makes the resulting capsules unstable to moisture. On the other hand, it is feared that dextrin having a DE lower than about 5 would bring about an excessively high viscosity of the carbohydrate mixture in the step of mixing with the flavor.

Of the other starch derivatives, preferred are starch derivatives wherein side chains are modified with hydrophilic or hydrophobic groups, etc. to thereby form a more complicated structure with a strong interaction between side chains (for example, starch esters, starch ethers). These starch derivatives having modified side chains are more preferred than the cross-bonding starches.

To elevate the moisture stability of the capsules during storage, it is particularly desirable to use a modified starch having a high molecular weight and a branched structure. As modified starches of a branched structure, products prepared by modifying starch containing amylopectin at a high content may be preferably used. It is recommended to use those prepared from starch containing amylopectin at a content of about 80% by weight or more. Particular examples of the starches include amioca starch, tapioca starch and waxy maize. Of these, modified starches derived from waxy maize are particularly preferred, and the specific examples thereof include PURITY® GUM 59, PURITY® GUM BE, PURITY® GUM 1773, N-LOK® (products of National Starch and Chemical Company, Food Starch-Modified), etc.

It is expected that the use of viscous polysaccharides (for example gum substances, agar, carrageenan, alginic acid, chitin, chitosan) with modified starches further improves the moisture-stability of the resulting capsules via interactions between side chains. As examples of the gum substances, cyamoposis gum, locust bean gum, gum arabic, karaya gum and tragacanth may be cited.

When these polysaccharides are used at an excessively high ratio, however, the carbohydrate mixture has an excessively high viscosity and, as a result, the addition of the flavor and the extrusion molding become difficult.

As the hydrogenated saccharide to be used in the present invention, on the other hand, one or more substances may be optionally selected from xylitol, lactitol, maltitol, isomalt (hydrogenated palatinose, i.e., a mixture of 6-O-α-D-glucopyranosyl-D-sorbitol and 1-O-α-D-glucopyranosyl-D-mannitol) and hydrogenated corn syrup. Regarding hydrogenated corn syrup, it is recommended to use one prepared from corn syrup containing as much maltose as possible. If these substances are used as hydrogenated saccharides in the present invention, another hydrogenated saccharide such as sorbitol can also be added.

At the mixing of the modified starch(es) with the hydrogenated saccharide(s) thus selected, water may be added if required. It is preferable that water, if added, is used in the smallest amount allowing the uniform dispersion of the carbohydrate mixture. More particularly, the amount of water is preferably controlled to about 3 to about 40% by weight based on the carbohydrate mixture. It is not preferable to add water in an excessively large amount, since a prolonged heating time is required later for lowering the moisture content in this case.

Further, protein such as gelatin, whey, separated soybean protein, etc. may be added to the carbohydrate mixture of the modified starch(es) with the hydrogenated saccharide(s).

The carbohydrate mixture of the modified starch(es) with the hydrogenated saccharide(s) is heated to a temperature of from about 110° to about 200° C. until the carbohydrate mixture is molten and the moisture content is lowered to a certain level, though the heating temperature varies depending on the composition of the mixture. It is preferable to boil down the carbohydrate mixture in, for example, a pot until the moisture content reaches about 0.5 to about 6% by weight. It is not preferable that the moisture content is too high at this point, since the resulting capsules contains too much moisture and have a poor moisture-stability in this case.

Next, a flavor is added to the molten matter thus obtained. Other additives may be added thereto simultaneously, if required. The moisture-stability of the obtained capsules varies depending on the contents of moisture, the flavor and other additives. Excessively large contents of these components at the molding step make the stability poor. It is preferable to adjust the content of the flavor to about 20% by weight or below based on the carbohydrate mixture. When the flavor is added in an amount less than about 0.2% by weight, however, no effect of the flavor can be achieved. That is to say, the content of the flavor preferably ranges from about 0.2 to about 20% by weight, still preferably from about 1 to about 15% by weight, based on the carbohydrate mixture.

The flavor to be used in the present invention is not particularly restricted but arbitrarily selected from among fat-soluble flavors, water-soluble flavors or synthetic flavors and natural extracts.

Specific examples of the flavor include essential oils such as orange oil, lemon oil, peppermint oil and vanilla, essences such as apple essence and strawberry essence, hydrocarbons such as β-caryophyllene, alcohols such as l-menthol, aldehydes such as vanillin, esters such as geranyl formate, benzyl formate and ethyl acetate, and flavor compositions such as beef flavor, pork flavor, chicken flavor and butter flavor.

As other additives, for example, emulsifiers for dispersing the flavor in the carbohydrates and antioxidants may be optionally added, if required. As the emulsifier, those authorized as a food additive may be arbitrarily used. It is particularly preferable to use lecithin or sucrose fatty acid ester having an HLB of about 4 to about 12 therefor. It is enough to add the emulsifier, if used, in an amount of from about 1 to about 7% by weight based on the weight of the flavor. As the antioxidant, those authorized as a food additive, for example, vitamin C, vitamin E and extracts of rosemary and sage may be used. From the viewpoint of harmony of the carbohydrate mixture with the flavor, it is particularly preferable to use vitamin E therefor. The content of the antioxidant, if used, may range from about 0.1 to about 2% by weight based on the weight of the flavor. As examples of other additives, edible colorants (e.g., Food Yellow No. 4 (tartrazine), Food Yellow No. 5 (sunset yellow FCF), Food Blue No. 1 (brilliant blue FCF), Food Blue No. 2 (indigocarmine), Food Red No. 2 (amaranth), Food Green No. 3 (fast green FCF), etc.) and nutritious substances (e.g., choline chloride, fumaric acid, etc.) may be cited.

The method for mixing the molten carbohydrate mixture with the flavor and other additives is not particularly restricted, so long as a uniform mixture can be obtained thereby. For example, the flavor and other additives may be added to the molten carbohydrate mixture which is under stirring in a homodisperser and then stirring is continued to thereby give a uniform mixture. Then the uniform mixture thus obtained is transferred into an extruder. After sealing, the mixture is extruded from the injection port of the extruder under applying pressure thereto. It is desirable to preliminarily heat the extruder so as to smoothly perform the extrusion.

Alternately, an extruder made of a pressure container, in which heating, mixing and extrusion can be performed, may be used. That is to say, the carbohydrate mixture, water, the flavor and other additives are fed into the extruder with the use of a feeder provided with, for example, a continuous flow pump. Next, these components are heated and mixed in the extruder and then extruded therefrom. This process is preferable, since a series of operations can be continuously carried out in a single container and thus the yield of the product per unit time can be elevated. It is particularly preferable to use an extruder having a construction by which the feed materials can be conveyed, heated and mixed at the same time (hereinafter referred to as a barrel) and which is provided with two or more screws. Compared with an extruder provided with a single screw, an extruder provided with two or more screws is excellent in the capability of conveying and mixing and thus enables more stable production. Further, an extruder having two or more screws is excellent in the performance of washing the inside of the container by itself, which makes the post-treatment washing and maintenance easy.

On the other hand, a cooling tank is cooled to an appropriately low temperature by feeding a refrigerant carrier thereto. Although the refrigerant carrier may be arbitrarily selected from among those exerting no harm from the viewpoint of food sanitation, it is preferable to select those which would not solubilize the carbohydrate mixture and can be easily eliminated from the surface of the capsules therefor. As particular examples of the refrigerant carrier, alcohols such as ethanol and isopropyl alcohol may be cited. The refrigerant carrier may be cooled by any method without restriction. For example, dry-ice or a cooling device such as a chiller can be selected therefor depending on the employed apparatus. The cooling temperature is adjusted to such a level as to be sufficient for quickly cooling and solidifying the uniform mixture extruded from the injection port of the extruder without softening the solid matter thus obtained. More particularly, it is preferably adjusted to about −10° to about −30° C. Thus the carbohydrate mixture having the flavor encapsulated therein is quickly cooled and solidified to thereby give a solid matter. The extrusion pressure may be at such a level that the carbohydrate mixture having the flavor encapsulated therein can be continuously extruded from the injection port of the extruder in the form of filaments, though it varies depending on the feed materials and the extruder. In the case of an extruder comprising a pressure container provided with an extruding plate, for example, it is recommended to apply a pressure of about 5 to about 50 psig by, for example, introducing a nitrogen gas after sealing the extruder.

The solid matter obtained by quickly cooling the uniform mixture thus extruded is cut or ground by, for example, stirring to thereby form capsules.

The obtained capsules are separated from the refrigerant carrier by, for example, centrifugation. Further it is preferable to add a caking inhibitor to the capsules to thereby prevent caking. As examples of the caking inhibitor, silicon dioxide, calcium tertiary phosphate and α-lactose may be cited. The caking inhibitor may be added in an amount of from about 0.1 to about 1% by weight based on the total weight.

Next, the capsules are dried. Although the drying method is not particularly restricted, it is necessary to select a method whereby the structure of the capsule is not damaged. It is preferable to perform drying under reduced pressure by using, for example, a vacuum rotating dryer.

The moisture content of the capsules thus obtained is preferably controlled to about 6% by weight or below.

Further, the capsules are sieved, if necessary, to thereby give the target flavor-containing sugar-free capsules.

The flavor-containing sugar-free capsules of the present invention thus obtained can be used for imparting a flavor to various foods such as candies and chewing gums.

To further illustrate the present invention in greater detail, and not by way of limitation, the following Examples will be given.

EXAMPLE 1

| Formulation | part by weight |
| --- | --- |
| (1) Food Starch-Modified (PURITY ® GUM 59, a product of National Starch and Chemical Company) | 200 |
| (2) dextrin (DE: 5) | 50 |
| (3) isomalt | 1000 |
| (4) deionized water | 380 |
| (5) lemon oil | 150 |
| (6) emulsifier (pasty lecithin) | 5 |

Components (1), (2) and (3) were dissolved in component (4) and heated to 135° C. to thereby give a molten mater. Component (5) was mixed with component (6) and added to the above-mentioned molten matter under stirring. After becoming uniform, the mixture was transferred into an extruder and extruded into a cooling tank containing isopropyl alcohol at −25° C. under a pressure of 20 psig. Then it was cut into pieces of a size of 20- to 60-mesh under stirring and the isopropyl alcohol adhering to the surface was eliminated. After adding 0.15% by weight based on the total weight of silicon dioxide as a caking inhibitor, drying under reduced pressure was performed in a vacuum rotating dryer. The capsules thus obtained contained 3.7% by weight of moisture.

EXAMPLE 2

| Formulation | part by weight |
| --- | --- |
| (1) dextrin (DE: 20) | 320 |
| (2) gum arabic | 30 |
| (3) maltitol | 900 |
| (4) deionized water | 380 |
| (5) lemon oil | 100 |
| (6) emulsifier (pasty lecithin) | 4 |

Components (1), (2) and (3) were preliminarily mixed together and introduced into an extruder having two screws with a continuous flow feeder. At the same time, component (4) was added thereto while controlling the amount of flow with the use of a continuous flow pump. The temperature inside the extruder was set to about 135° C. and a mixture of component (5) with component (6) was added thereinto with the use of another continuous flow pump. The uniform mixture thus obtained was extruded into a cooling tank containing isopropyl alcohol at −25° C. through 4 dies (diameter: 2.5 mm) in the extruding plate of the extruder. Then it was cut into pieces of a size of 20- to 60-mesh under stirring and the isopropyl alcohol adhering to the surface was eliminated. After adding 0.15% by weight based on the total weight of silicon dioxide as a caking inhibitor, drying under reduced pressure was performed in a vacuum rotating dryer. Thus capsules containing 5.2% by weight of moisture were obtained.

EXAMPLE 3

| Formulation | part by weight |
| --- | --- |
| (1) dextrin (DE: 10) | 190 |
| (2) Food Starch-Modified (PURITY ® GUM 59, a product of National Starch and Chemical, Company) | 10 |
| (3) isomalt | 900 |
| (4) deionized water | 380 |
| (5) lemon oil | 100 |
| (6) emulsifier (pasty lecithin) | 4 |
| (7) Food Yellow No. 5 | 1 |

Components (1), (2) and (3) were dissolved in (4) and introduced into an extruder comprising a pressure container provided with an extruding plate. After heating to 140° C., a molten matter was obtained. Separately, components (5), (6) and (7) were mixed together and added to the above-mentioned molten matter. After becoming uniform, the mixture was extruded into a cooling tank containing isopropyl alcohol at −25° C. through dies in the extruding plate of the extruder under applying a nitrogen gas pressure of 20 psig. Then it was cut into pieces of a size of 20- to 60-mesh under stirring and the isopropyl alcohol adhering to the surface was eliminated. Then 0.15% by weight based on the total weight of silicon dioxide was added as a caking inhibitor and drying under reduced pressure was performed in a vacuum rotating dryer.

The capsules thus obtained contained 3.9% by weight of moisture and were in the form of uniform, yellow cylinders. The flavor was well encapsulated and only a slight smell resided on the surface after eliminating isopropyl alcohol. When these capsules were dissolved in warm water at a temperature higher than the bodily temperature, a preferable smell could be instantaneously obtained.

EXAMPLE 4

| Formulation | part by weight |
| --- | --- |
| (1) dextrin (DE: 20) | 320 |
| (2) chitosan | 30 |
| (3) maltitol | 900 |
| (4) deionized water | 40 |
| (5) lemon oil | 30 |
| (6) emulsifier (pasty lecithin) | 2 |

Components (1), (2) and (3) were dissolved in component (4) and introduced into an extruder comprising a pressure container provided with an extruding plate. After heating to 140° C., a molten matter was obtained. Separately, components (5) and (6) were mixed together and added to the above-mentioned molten matter. After becoming uniform, the mixture was extruded into a cooling tank containing isopropyl alcohol at −25° C. through dies in the extruding plate of the extruder under applying a nitrogen gas pressure of 20 psig. Then it was cut into pieces of a size of 20- to 60-mesh under stirring and the isopropyl alcohol adhering to the surface was eliminated. Then 0.15% by weight based on the total weight of silicon dioxide was added as a caking inhibitor and drying under reduced pressure was performed in a vacuum rotating dryer. The capsules thus obtained contained 3.9% by weight of moisture.

After the completion of heating, the molten matter had a somewhat high viscosity, which made the addition of the flavor and the extrusion slightly difficult. However the obtained product was highly excellent in moisture-stability.

EXAMPLE 5

| Formulation | part by weight |
|---|---|
| (1) Food Starch-Modified (PURITY ® GUM 59, a product of National Starch and Chemical Company) | 550 |
| (2) Amioca (a product of National Starch and Chemical Company, starch mainly comprising amylopectin) | 250 |
| (3) xylitol | 250 |
| (4) sorbitol | 50 |
| (5) deionized water | 380 |
| (6) lemon oil | 100 |
| (7) emulsifier (pasty lecithin) | 4 |

Components (1), (2), (3) and (4) were dissolved in component (5) and introduced into an extruder comprising a pressure container provided with an extruding plate. After heating to 145° C., a molten matter was obtained. Separately, components (6) and (7) were mixed together and added to the above-mentioned molten matter. After becoming uniform, the mixture was extruded into a cooling tank containing isopropyl alcohol at −25° C. through dies in the extruding plate of the extruder under applying a nitrogen gas pressure of 20 psig. Then it was cut into pieces of a size of 20- to 60-mesh under stirring and the isopropyl alcohol adhering to the surface was eliminated. Then 0.15% by weight based on the total weight of silicon dioxide was added as a caking inhibitor and drying under reduced pressure was performed in a vacuum rotating dryer. The capsules thus obtained contained 3.9% by weight of moisture.

The capsules obtained in the above Examples 1 to 5 were stored at a relative humidity of 53% at a temperature of 30° C. for 3 weeks to evaluate the stability. Table 1 shows the results.

TABLE 1

| Conditions of stored capsules | |
|---|---|
| Ex. 1 | Almost the same as pre-tested conditions. No oozing-out of the flavor. |
| Ex. 2 | Almost the same as pre-tested conditions. No oozing-out of the flavor. |
| Ex. 3 | Almost the same as pre-tested conditions. No oozing-out of the flavor. |
| Ex. 4 | No change. |
| Ex. 5 | Showing some hygroscopicity and a slight decrease in flowability. No oozing-out of the flavor. |

As Table 1 shows, the capsules of Example 5, which contained polysaccharides in a larger amount than hydrogenated saccharides, suffered from a slight decrease in flowability but it would not cause any serious problem in the case of storage in a sealed state, while other capsules showed excellent stability, proving that they can be stored for a prolonged period of time.

When the capsules obtained in Example 3 were added to a chewing gum base, the yellow crystalline structure remained unbroken. When the molded gum product thus obtained was stored at room temperature for 1 month, neither any dissolution of the capsules nor color oozing-out was observed.

EXAMPLE 6

Flavor-containing sugar-free capsules were produced by using the following formulation and the following encapsulation method.

| Formulation: | part by weight |
|---|---|
| (1) Food starch-modified derived from waxy maize (PURITY ® GUM 59, a product of National Starch and Chemical Company) | 250 |
| (2) isomalt | 750 |
| (3) deionized water | 400 |
| (4) lemon oil | 100 |
| (5) emulsifier (pasty lecitin) | 4 |
| (6) antioxidant (vitamin E) | 0.4 |

Component (1) was dissolved in component (3) which was heated to about 50° C., and further component (2) was added thereto while stirring. After dissolving, stirring was further continued and the mixture was heated to 145° C., and then was rapidly cooled to 130° C. Separately, components (4), (5) and (6) were mixed together and added to the above-mentioned mixture while stirring by a high-speed stirrer. After becoming uniform, the mixture was transferred into an extruder and extruded into a cooling tank containing isopropyl alcohol at −25° C. under a pressure of 30 psig. Then it was cut into pieces of a size of 20- to 60-mesh under stirring and the isopropyl alcohol adhering to the surface was eliminated.

The thus obtained capsules were observed and evaluated. As a result, stable extrusion could be applied at the production step of the capsules and crystalline excellent capsules were obtained. Further, when these capsules were mixed into a chewing gum base, there was no destruction of capsule structure.

EXAMPLE 7

Flavor-containing sugar-free capsules were obtained in the same manner as in Example 6, except that the modified starch as component (1) was replaced with another food starch-modified derived from waxy maize (PURITY® GUM BE, a product of National Starch and Chemical Company).

The thus obtained capsules were observed and evaluated. As a result, although there was seen the generation of bubbles during heating of the carbohydrate mixture at the production of the capsules, preferable capsules were obtained.

EXAMPLE 8

Flavor-containing sugar-free capsules were obtained in the same manner as in Example 6, except that the modified starch as component (1) was replaced with food starch-modified derived from waxy maize with corn syrup solids (N-LOK®, a product of National Starch and Chemical Company).

The thus obtained capsules were observed and evaluated. As a result, although there was seen the generation of bubbles during the heating of the carbohydrate mixture at the production of the capsules, preferable capsules were obtained.

EXAMPLE 9

Flavor-containing sugar-free capsules were obtained in the same manner as in Example 6, except that the modified starch as component (1) was replaced with enzyme converted maltodextrin (LO-DEX® 10, a product of American Maize-Products Company).

The thus obtained capsules were observed and evaluated. As a result, although there was seen some hygroscopicity during the storage of the obtained capsules, no oozing-out of the flavor was seen.

COMPARATIVE EXAMPLE 1

The production of capsules was attempted in the same manner as in Example 6, except that isomalt was replaced with mannitol as described in U.S. Pat. No. 4,532,145. However, a paste-like product with powder was formed during the heating of the carbohydrate mixture and no uniform product was obtained. Further, encapsulation by extrusion was practically impossible.

COMPARATIVE EXAMPLE 2

The production of capsules was attempted in the same manner as in Example 6, except that isomalt was replaced with sorbitol. However, the viscosity of the mixture at extrusion was very low, the structure of the capsules extruded in the solvent had mostly gammy, and the obtained capsules had very strong hygroscopicity and were unsuitable for use of food products such as chewing gum.

As discussed above, the present invention makes it possible to produce flavor-containing sugar-free capsules which have a low cariogenicity and a structural strength of a certain level and can be stored for a prolonged period of time.

While the invention has been described in detail and with reference to specific embodiments thereof, it will be apparent to one skilled in the art that various changes and modifications can be made therein without departing from the spirit and scope thereof.

What is claimed is:

1. A process for producing flavor-containing sugar-free capsules comprising the steps of:

(a) heating a carbohydrate mixture containing at least one modified starch and at least one hydrogenated saccharide at a weight ratio of from about 15:85 to about 85:15 on a solid basis to give a molten material;

(b) adding a flavor to said molten material and mixing said flavor and said molten material to thereby give a uniform mixture;

(c) solidifying said uniform mixture by rapidly cooling under extrusion to yield a solid material; and (d) cutting or grinding the solid material thus obtained, wherein said at least one hydrogenated saccharide is one or more substances selected from the group consisting of xylitol, lactitol, maltitol, isomalt, and hydrogenated corn syrup.

2. A process for producing flavor-containing sugar-free capsules as claimed in claim 1, wherein the content of the flavor to the carbohydrate mixture is from about 0.2 to about 20% by weight.

3. A process for producing flavor-containing sugar-free capsules as claimed in claim 1, wherein said at least one modified starch is a product prepared by modifying starch containing amylopectin at a ratio of about 80% by weight or above.

4. A process for producing flavor-containing sugar-free capsules as claimed in claim 1, wherein the carbohydrate mixture is heated to a temperature of about 110° to about 200° C.

5. A process for producing flavor-containing sugar-free capsules as claimed in claim 1, wherein the extrusion of said uniform mixture is performed with the use of an extruder comprising a pressure container provided with two or more screws.

\* \* \* \* \*